United States Patent Office 3,425,981
Patented Feb. 4, 1969

3,425,981
OLEFIN POLYMER COMPOSITIONS CONTAINING ETHYLENE OXIDE POLYMERS HAVING A MOLECULAR WEIGHT OF FROM 100,000 TO 10 MILLION
Paul P. Puletti, Somerville, and Jack H. Gardner, South Bound Brook, N.J., assignors to Union Carbide Corporation, a corporation of New York
No Drawing. Filed Feb. 12, 1965, Ser. No. 432,427
U.S. Cl. 260—41                                   14 Claims
Int. Cl. C08f 29/0; C08g 43/02

ABSTRACT OF THE DISCLOSURE

Olefin polymer compositions containing ethylene oxide polymers having a molecular weight of from 100,000 to 10 million are shown to exhibit enhanced anti-static properties.

---

This invention relates to improved olefin polymer compositions. More particularly this invention relates to olefin polymer compositions which exhibit enhanced anti-static properties.

It has been long known in the art that olefin polymers exhibit relatively high electrostatic retention. As a result films and molded products made from this class of polymer tend to acquire and retain an electrostatic charge which in turn causes such articles to attract to their surfaces particles of dust, dirt and other refuse. This attracted material causes the article to appear unsightly. In the case of film, it contributes to blocking.

In an attempt to overcome this deficiency many antistatic agents have been proposed for polyethylene. Many of these additives do in fact reduce the electrostatic properties of olefin polymers but many of these agents do not provide the long range antistatic properties desired and some adversely effect the other characteristics of the polymer.

In accordance with the present invention it has been found that olefin polymer compositions containing ethylene oxide polymers having a molecular weight of from 100,000 to 10 million exhibit enhanced antistatic properties.

Included within the term olefin polymer are the olefin homopolymers of the lower olefin monomers such as those containing from 2 to 4 carbon atoms. Illustrative of such homopolymers are high density or linear polyethylene, low density or branched polyethylene, polypropylene, polybutene, and the like.

Also included within this term are the olefin copolymers formed by the copolymerization of an olefin monomer and one or more copolymerizable monomers. Monomers which provide copolymers of outstanding characteristics are the vinyl type copolymers.

Illustrative of vinyl monomers containing the

group, and mixtures thereof which can be copolymerized with an olefin monomer to form thermoplastic polymers which can be utilized in accordance with the present invention are the following: vinyl aryls such as styrene, o-methoxystyrene, p-methoxystyrene, m-methoxystyrene, o-nitrostyrene, m-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides such as vinyl chloride, vinylidene chloride, vinylidene bromide and the like; vinyl esters such as vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; alkyl esters of maleic and fumaric acid such as dimethyl maleate, diethyl maleate and the like; vinyl alkyl esters and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidine, ethyl methylene malonate and the like.

Preferred copolymers are styrene and the ethylene copolymers such as ethylene/ethyl acrylate, ethylene/vinyl acetate, ethylene/vinyl chloride, ethylene/acrylic acid, and the like.

The olefin polymer resins are desirably of the film forming type. Those resins generally exhibit melt indices of from .1 to 20 decigrams per minute inclusive.

Also included within the term olefin polymers are the blends of olefin polymers with other polymers. Illustrative of such blends are polyethylene with polypropylene, low density polyethylene with high density polyethylene, polyethylene with olefin copolymers such as these indicated above for example, ethylene/acrylic acid copolymer, ethylene/methyl acrylate copolymer, ethylene/ethylacrylate copolymer, ethylene/vinyl acetate copolymer, ethylene/acrylic acid/ethyl acrylate terpolymer, ethylene/acrylic acid/vinyl acetate terpolymer, and the like.

Also included within the blend of olefin polymers are the metallic salts of those olefin copolymers or blends which contain free carboxylic acid groups. Illustrative of such polymers are ethylene/acrylic acid copolymer, ethylene/methacrylic acid, ethylene/ethacrylic acid, styrene/acrylic acid, styrene/methacrylic acid, oxidized polyolefins, propylene/acrylic acid copolymer, butene/acrylic acid copolymer and the like.

Illustrative of the metals which can be used to provide the salts of said carboxylic acid polymers are the one, two, and three valence metals, such as sodium, lithium, potassium, calcium, magnesium, aluminum, barium, zinc, zirconium, beryllium, iron, nickel, cobalt, and the like.

Preferred blends include polyethylene/ethylene/vinyl acetate copolymer blend.

The ethylene oxide polymer component of the compositions of this invention is selected from the resinous ethylene oxide polymeric materials having an average molecular weight of from 100,000 to ten million and preferably in the range of from about 200,000 to about 1,000,000. The term "ethylene oxide polymers" refers to polymers possessing the repeating unit (—$CH_2$—$CH_2O$—) as represented by the class of commercial "Polyox" resins; and the term is intended to include water soluble ethylene oxide polymer resins wherein ethylene oxide is the predominant monomer polymerized therein but which can also contain polymerized residues of other olefin oxides as exemplified by copolymers and terpolymers of ethylene oxide with other copolymerizable monomers containing single epoxide groups such as proplyene oxide, butylene oxide, styrene oxide and the like. Poly(ethylene oxide) homopolymer is however preferred as the ethylene oxide polymer resin and shall be used hereinafter as representative of these resins.

The ethylene oxide polymer is generally used in an amount sufficient to impart the desired printability properties. These amounts are generally of from about 1.5 to about 15 parts by weight based on 100 parts by weight of the olefin polymer resin. Amounts of from about 2 to about 4 parts by weight however, are preferred.

The ethylene oxide polymer can generally be blended with the olefin polymer by general melt blending techniques utilizing conventional equipment. It facilitates blending however if the resinous components are premixed as dry powders before blending in the melt. If desired solution admixture can be used.

While the polymeric compositions of this invention can be used without filler materials it should be noted that filled polymer compositions of this invention containing from about 15 to about 50 parts by weight finely divided filler per hundred parts olefin polymer provides excellent antistatic properties and also provide excellent printing surfaces. For these reasons and the apparent economic advantages, these filled compositions are preferred for these applications where transparency of the polymer is not required. When the filled polymer compositions are to be used in making film a filler particle size of from $0.01\mu$ to $15\mu$ can be used. Film forming compositions containing a filler having a particle size of from 0.2 to $6\mu$ are preferred. In applications other than film, filler size is not critical.

Illustrative of the filler materials which can be used in the compositions of this invention are fillers such as barium sulfate, calcium sulfate, silica, fibrous asbestos, talc, calcium silicate, magnesium silicate, mica, soapstone, slate flour, pumice, wood flour, soy bean flour, tobacco flour, walnut shell flour, sulfur, tripolite, calcium oxide, magnesium oxide, calcite, diatomaceous earth, fuller's earth, alumite, calcium phosphate, magnesium phosphate, bauxite, chalk, magnesite, kaolin clay, bentonite clay, ball clay, fire clay, dolomite, muscovite, paragonite, margarite, vermiculite, pyrophyllite, apatite, tricalcium phosphate, titanium dioxide, volcanic dust and the like.

It should be noted that various additive or modifying compounds as are normally present in the resinous components or normally used in such compositions can be present in the polymer compositions of this invention. Such additives include resin stabilizers to protect the resinous components from degradation caused by shear, heat, light oxidation and the like and which are usually provided in commercially available resins, lubricants, dyes, pigments and the like.

The polymer compositions of this invention provide excellent self-supporting films and sheets when extruded by conventional techniques, and provide printable surfaces exhibiting excellent ink adhesion.

When these compositions are to be used as self-supporting films they are generally prepared in thicknesses of from about 0.5 mil to about 15 mils.

It will be also appreciated that the polymer compositions of this invention can be used to coat various substrates such as paper cardboard, hardboard, metal foil, metal sheet and the like. These compositions can be readily coated on such substrates through the employment of conventional extrusion coating techniques or other coating means known and used by the art.

A particularly preferred film forming resin formulation is as follows:

| | Parts by weight |
|---|---|
| Olefin polymer resin | 100 |
| Filler | 33 |
| Ethylene oxide polymer | 3 |

In the examples which follow the following tests were used to evaluate the compositions:

ANTISTATIC TEST

Cigarette ash pick-up test

The surface of each film specimen was rubbed vigorously in a circular manner for 10 seconds with a woolen cloth. Each charged specimen was held one inch above cigarette ashes. The amount of ash picked up on the surface of each film was quantitatively estimated as heavy, medium, slight, or none.

Secant modulus of elasticity (stiffness)

This method relates to a procedure for determining the secant modulus of elasticity of stiffness of materials by means of an Instron tensile tester, Model TM, manufactured by the Instron Engineering Corporation.

The tensile tester is adjusted to give a crosshead speed of 0.2 inch per minute and a chart speed of 20 inches/minute. The sample is cut with a standard "dog bone" cutter die giving an effective specimen length of 1.9 inches. After the specimens have been cut their thickness is measured and recorded.

The test specimen is mounted on the tensile tester and the tester is activated. After the chart has recorded a vertical displacement of 1.9 inches, the tester is turned off and reset for the next test. An elongation measured by 1.9 inches of vertical pen travel constitutes a one per cent elongation of test specimen. The load in pounds is determined for one per cent elongation directly from the chart. The secant modulus of elasticity is determined by use of the formula $$\text{Secant modulus (p.s.i.)} = \frac{100 \times L}{WT}$$

wherein

L = the load in pounds at 1% elongation
W = the average width in inches
T = the average thickness in inches

Tear resistance test

Olefin polymer: Polyethylene having A.S.T.M. D–689–44.

EXAMPLE I

An olefin polymer composition was prepared having the following formulation:

| Ingredient: | Parts by weight |
|---|---|
| Olefin polymer: Polyethylene— Having a density of .960 and a melt index of 0.1 blended with ethylene/vinyl acetate copolymer | 100 total, 85 (PE). |
| Containing 18% polymerized vinyl acetate | 15 (Co.). |
| Filler: 2:1 diatomaceous earth to titanium dioxide | 45 (F). |

To this standard composition were then added 1.0, 2.0, 5.0, and 10.0 parts by weight of an ethylene oxide homopolymer, exhibiting a reduced viscosity as a 0.05 per cent aqueous solution of 6.1–7.3 centipoises. These compositions were prepared by melt blending the ingredients. The compositions were then extruded into 4 mil film and evaluated. The results were as follows:

| Sample | | Antistatic test | Secant modulus of elasticity | Affect on tear resistance |
|---|---|---|---|---|
| 1 | Control (standard formulation). | Heavy | 140,000 | |
| 2 | 1.0 percent poly-(ethylene oxide). | Slight | 140,000 | None. |
| 3 | 2.0 percent poly-(ethylene oxide). | None | 140,000 | Do. |
| 4 | 5.0 percent poly-(ethylene oxide). | ___do___ | 135,000 | Slight. increase. |
| 5 | 10.0 percent poly-(ethylene oxide). | ___do___ | 125,000 | Do. |

In a similar manner the effective static reduction in low density polyethylene, high density polyethylene, and polypropylene is evaluated by the addition of ethylene oxide polymers having a molecular weight greater than 100,000. This is demonstrated for both filled and unfilled compositions.

What is claimed is:

1. An olefin polymer composition comprising an ethylene polymer resin and from about 0.10 to 15 parts by weight per 100 parts by weight of said ethylene polymer resin of an ethylene oxide polymer having a molecular weight greater than 100,000 and selected from the group consisting of ethylene oxide homopolymers and ethylene oxide copolymers wherein the predominant monomer polymerized therein is ethylene oxide and wherein the remaining monomers polymerized therein contain a single epoxide group.

2. The composition of claim 1 wherein a finely divided filler material is present in the composition in an amount of from 0 to 100 parts by weight per 100 parts by weight olefin polymer resin.

3. The composition of claim 1 wherein the ethylene resin is polyethylene.

4. The composition of claim 1 wherein the ethylene polymer resin is high density polyethylene having a density of from .945 to .970.

5. The composition of claim 1 wherein the ethylene polymer is an ethylene copolymer resin.

6. The composition of claim 1 wherein the ethylene polymer resin is a blend of lower olefin homopolymer and an ethylene copolymer.

7. The composition of claim 6 wherein the ethylene polymer resin is a blend of polyethylene and ethylene/vinyl acetate copolymer.

8. The composition of claim 1 wherein the ethylene oxide polymer is ethylene oxide homopolymer.

9. A film forming olefin polymer composition comprising an ethylene polymer resin and from about 1.5 to about 15 parts by weight based on the weight of the ethylene polymer of an ethylene oxide polymer having a molecular weight of from about 100,000 to about ten million and selected from the group consisting of ethylene oxide homopolymers and ethylene oxide copolymers wherein the predominant monomer polymerized therein is ethylene oxide and wherein the remaining monomers polymerized therein contain a single epoxide group.

10. The composition of claim 9 wherein the olefin polymer resin is a blend of high density polyethylene and an ethylene copolymer and a finely divided filler is present in an amount of from 0 to 100 parts based upon the weight of the olefin polymer.

11. A film forming olefine polymer composition comprising a blend of polyethylene having a density of from 0.945 to 0.970 and ethylene/vinyl acetate copolymer, from about 2 to about 4 parts by weight per hundred parts olefin polymer of an ethylene oxide polymer having a molecular weight of from about 200,000 to about 1,000,000 and selected from the group consisting of ethylene oxide homopolymers and ethylene oxide copolymers wherein the predominant monomer polymerized therein is ethylene oxide and wherein the remaining monomers polymerized therein contain a single epoxide group, and from about 15 to about 50 parts per hundred parts by weight olefin polymer of a finely divided filler having an average particle size of from $0.01\mu$ to about $15.0\mu$.

12. A film made from the composition of claim 10.

13. The method of providing an olefin polymer with enhanced antistatic properties comprising intimately blending said ethylene polymer with from 1.5 to 15 parts by weight based on the weight of the said ethylene polymer of an ethylene oxide polymer having a molecular weight of from 100,000 to 10 million and selected from the group consisting of ethylene oxide homopolymers and ethylene oxide copolymers wherein the predominant monomer polymerized therein is ethylene oxide and wherein the remaining monomers polymerized therein contain a single epoxide group.

14. The method of claim 13 wherein the ethylene oxide polymer has a molecular weight of from 100,000 to one million.

References Cited

UNITED STATES PATENTS

| | | | |
|---|---|---|---|
| 3,366,710 | 1/1968 | Press | 260—896 |
| 2,393,863 | 1/1946 | Myers. | |
| 2,525,691 | 10/1950 | Lee et al. | |
| 2,872,432 | 2/1959 | Metzer. | |
| 3,299,006 | 1/1967 | Tomiyama et al. | |

OTHER REFERENCES

"Development News," Chemical and Engineering News, volume 30, No. 22, June 2, 1962, pp. 2283–2285.

ALLAN LIEBERMAN, *Primary Examiner.*

U.S. Cl. X.R.

260—896, 897.